United States Patent [19]

Hosoda et al.

[11] 4,380,600

[45] Apr. 19, 1983

[54] AQUEOUS DISPERSION OF WATER-SOLUBLE POLYMER COMPOSITION

[75] Inventors: Yoshikazu Hosoda; Shigenobu Ishihara; Shoichi Kobayashi, all of Yokohama, Japan

[73] Assignee: Showa Denko K.K., Tokyo, Japan

[21] Appl. No.: 263,921

[22] Filed: May 15, 1981

Related U.S. Application Data

[63] Continuation of Ser. No. 49,054, Jun. 15, 1979, abandoned.

[30] Foreign Application Priority Data

Jun. 19, 1978 [JP] Japan .................................. 53-73232

[51] Int. Cl.³ .......................................... C08F 261/04
[52] U.S. Cl. .................................. 524/458; 524/457; 524/459; 524/460

[58] Field of Search ............. 260/29.6 WA, 29.6 WB, 260/29.6 RW, 29.6 NR, 17 A, 17.4 GC, 17.4 ST; 524/458

[56] References Cited

U.S. PATENT DOCUMENTS

| 4,042,529 | 8/1977 | Nimerick | 260/29.6 RW |
| 4,092,287 | 5/1978 | Ito | 260/29.6 RW |
| 4,248,754 | 2/1981 | Fox | 260/29.6 WB |
| 4,254,003 | 3/1981 | Fox | 260/29.6 NR |

*Primary Examiner*—Paul R. Michl
*Attorney, Agent, or Firm*—Wenderoth, Lind & Ponack

[57] ABSTRACT

An aqueous dispersion having good stability and fluidity, and a process for production thereof. The aqueous dispersion is produced by polymerizing (a) a specified amount of an ethylenically unsaturated monomer capable of forming a water-soluble polymer in (b) a specified amount of an aqueous solution containing a water-soluble polymer while adjusting the weight ratio of (a) to (b) to from 1:5 to 5:1.

17 Claims, No Drawings

AQUEOUS DISPERSION OF WATER-SOLUBLE POLYMER COMPOSITION

This is a continuation application of Ser. No. 49,054, filed June 15, 1979 now abandoned.

This invention relates to an aqueous dispersion, having good stability and fluidity, of a water-soluble polymer composition and a process for production thereof.

The term "good stability" means that the aqueous dispersion does not develop layer separation during long-term storage. The term "good fluidity" means that in regard to the polymer content, the aqueous dispersion has a lower viscosity than aqueous solutions of water-soluble polymers.

Briefly stated, the aqueous dispersion of a water-soluble polymer composition can be prepared by polymerizing (a) a specified amount of an ethylenically unsaturated monomer capable of forming a water-soluble polymer in (b) a specified amount of an aqueous solution containing a water-soluble polymer while adjusting the weight ratio of (a) to (b) to a specified value. The resulting product is an aqueous dispersion having such a form that fine particles composed of a high-molecular-weight water-soluble polymer formed from the monomer (a) and the water-soluble polymer (b) are uniformly dispersed in an aqueous medium. This aqueous dispersion has the property of readily giving a uniform aqueous solution by being diluted with water.

The aqueous dispersion in accordance with this invention, if required in the form of an aqueous solution resulting from dilution with water, can be advantageously used in a number of technological fields as flocculating agents, thickeners, soil conditioners, adhesives, food additives, dispersants, detergents, additives for medicines or cosmetics, etc.

Water-soluble polymers obtained from ethylenically unsaturated monomers capable of forming water-soluble polymers have been supplied to the market for use in the various fields mentioned above. As typical examples, water-soluble polyacrylamide, poly(sodium acrylate), and polydimethylaminoethyl methacrylate quaternary salt are used as flocculating agents or precipitants in the pulp industry, the bauxite-treating step in alumina production, and sewage treatment, respectively. The poly(sodium acrylate) is also useful as a caking agent in processing food such as sausage or a thickener for latices and other materials.

In almost all cases, the aforesaid conventional water-soluble polymers are now supplied to the market in powder form, and the consumers dissolve the powder in water for actual application. The powdery polymer swells in water, and the particles flocculate or become jelly-like. It is considerably difficult to dissolve such a polymer in water, and it is virtually impossible to form a concentrated uniform aqueous solution. Thus, the consumers frequently experience the trouble of powder scattering and the difficulty of forming a uniform polymer solution in using the powdery polymer obtained from the market. In spite of such an inconvenience, water-soluble polymers are now supplied in powder form. This is mainly because conventional polymerization methods are unable to afford high-concentration aqueous solutions or aqueous dispersions of high-molecular-weight water-soluble polymers. In addition to inconvenience in use, the production of powdery polymers is uneconomical. It is apparent that in recovering a powdery polymer from an aqueous polymer solution obtained by such a conventional polymerization method, the cost and heat energy required for the evaporation of a large quantity of water and the drying of powder are great. Conventional polymerization methods for the production of water-soluble polymers from ethylenically unsaturated monomers are described below at some length.

The most general conventional method for producing water-soluble polymers is a solution polymerization method using water as a solvent. This method has the advantage that polymerization can be easily carried out by using an aqueous solution of a monomer in the presence of a polymerization initiator, and it is easy to obtain a high-molecular-weight polymer. However, it has the following defects.

(1) The heat of reaction is extremely difficult to remove in the polymerization process.

(2) Since there is a limit (5 to 30%) to the concentration of the monomer in the aqueous solution during polymerization, productivity is difficult to increase.

(3) With the progress of the reaction, the reaction mixture increase markedly in viscosity and is difficult to stir, thus yielding a jelly-like product. The jelly-like polymer is very inconvenient to handle, and to powderize it, complex treating steps such as recovery, drying and pulverization are required.

In an attempt to remedy these defects, there have been suggested a precipitation polymerization in which the polymerization is carried out in an organic solvent capable of dissolving the monomer but not the polymer, and the resulting polymer is separated as a precipitate, and a water-in-oil suspension polymerization in which a mixture of the monomer and water is dispersed with the aid of a surface-active agent in an organic solvent in which both the monomer and the polymer are sparingly soluble, and then polymerized. These methods, however, have various defects. For example, since an organic solvent is used, it is difficult to obtain a high-molecular-weight polymer. Moreover, a large-sized apparatus is required from the standpoint of the recovery of the organic solvent. The resulting polymer does not easily dissolve uniformly in water, and a jelly-like mass tends to form. Once the jelly-like mass has formed, water cannot easily penetrate into the inside of the jelly-like mass, and considerable periods of time are required for dissolving the polymer.

In addition to the aforesaid methods, a method has also been suggested which comprises polymerizing a water-soluble ethylenically unsaturated monomer in a hydrophobic liquid organic dispersing medium containing an emulsifier to form a water-in-oil type emulsion, and transforming it in the presence of water into an oil-in-water type emulsion without separating the resulting polymer, the final oil-in-water emulsion being used for actual application. Since, however, a large amount of a water-soluble organic solvent is used, secondary pollution by the organic solvent becomes a problem, and also, a surface-active agent is required so as to transform the water-in-oil emulsion into the oil-in-water emulsion. Moreover, the stability of the dispersion is not satisfactory, and coagulation may occur during storage or transportation.

According to this invention, a process for producing an aqueous dispersion of a water-soluble polymer free from the defects of the various conventional methods described above has now been found. According to this process the polymerization is carried out easily without causing an increase in viscosity which may make it difficult to stir the reaction mixture, and an aqueous dispersion of a polymer in an unprecedented high concentration can be obtained in a stable and highly flowable state. The molecular weight of the polymer obtained is equivalent to those of high-molecular-weight polymers obtained by the conventional aqueous solution polymerization methods. The aqueous dispersion of a water-soluble polymer obtained by the process of this invention can be easily diluted with water to a uniform aqueous solution of polymer without the difficulties associated with powdery polymers. The resulting aqueous solution can be advantageously applied for use as flocculating agents and other uses described hereinabove.

The present invention is described in more detail below.

According to this invention, there is provided a process for producing an aqueous dispersion, having good stability and fluidity, of a water-soluble polymer composition, which comprises polymerizing (a) at least one ethylenically unsaturated monomer capable of forming a water-soluble polymer in an aqueous solution of (b) at least one water-soluble polymer which is different from the polymer derived from said monomer, said aqueous solution containing 3 to 150 parts by weight of said water-soluble polymer (b) per 100 parts by weight of water, the amount of said monomer (a) being 10 to 150 parts by weight per 100 parts by weight of said water, with the weight ratio of (a):(b) being within the range of from 1:5 to 5:1.

The characteristic feature of the process of this invention is that a relatively large amount of the ethylenically unsaturated monomer (a) is polymerized in an aqueous solution containing a relatively large amount of the water-soluble polymer (b). According to the process of this invention, the increase of viscosity which may cause the difficulty of stirring does not occur during the polymerization process. The resulting product has good stability and fluidity despite the fact that it has a relatively high concentration. Moreover the aqueous dispersion can be easily diluted with water to a uniform aqueous solution. These advantages are believed to be ascribed to the following reasons.

When in accordance with the process of this invention, the water-soluble ethylenically unsaturated monomer (a) is polymerized in the aqueous solution of the water-soluble polymer (b), the resulting water-soluble ethylenic polymer forms a loose water-containing complex with the water-soluble polymer (b) without being dissolved in water. Phase separation occurs between the complex and the aqueous phase to form microscopic particles. This is believed to be the reason why a low-viscosity aqueous dispersion results. As another possibility, since the resulting water-soluble ethylenic polymer and the water-soluble polymer (b) originally present do not dissolve in each other, the resulting polymer and the aqueous solution of the polymer (b) are subject to phase separation with the progress of the polymerization. Thus, the resulting polymer becomes microscopically small globules which disperse in the aqueous solution of the water-soluble polymer (b) thereby forming a low-viscosity aqueous dispersion.

When a sufficient amount of water is added to the resulting aqueous dispersion, the state of phase separation will be easily destroyed to form a uniform aqueous solution.

Ethylenically unsaturated monomers (a) capable of forming a water-soluble polymer which are to be polymerized by the process of this invention are known. Most of these monomers contain an acroyl group in the molecule. Typically, these monomers are expressed by the following formulae (I), (II) and (III).

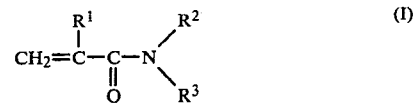

wherein $R^1$ represents H or methyl, and $R^2$ and $R^3$, independently from each other, represent H, $C_1$–$C_5$ alkyl, or $C_1$–$C_5$ hydroxyalkyl.

Monomers of formula (I) include acrylamide, methacrylamide, N-methylacrylamide, N-methylmethacrylamide, N,N-dimethylacrylamide, N,N-dimethylmethacrylamide, N,N-diethylacrylamide, N,N-diethylmethacrylamide, N-methyl-N-ethylacrylamide, N-methyl-N-ethylmethacrylamide, N-hydroxyethylacrylamide, and N-hydroxyethylmethacrylamide.

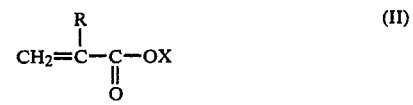

wherein R represents H, methyl or halogen, and X represents H, alkali metal or —$NH_4$.

Monomers of formula (II) include acrylic acid, methacrylic acid, alkali metal acrylates such as sodium acrylate and potassium acrylate, alkali metal methacrylates such as sodium methacrylate and potassium methacrylate, ammonium acrylate, ammonium methacrylate, alpha-chloroacrylic acid, alphabromoacrylic acid, and alpha-fluoroacrylic acid.

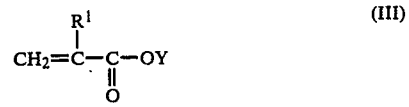

wherein $R^1$ represents H or methyl, and Y represents

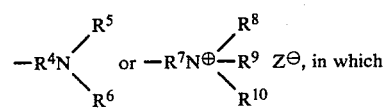

$R^4$ and $R^7$ represent $C_2$–$C_5$ alkylene or $C_2$–$C_5$ hydroxyalkylene, $R^5$, $R^6$, $R^8$ and $R^9$ represent $C_1$–$C_5$ alkyl, $R^{10}$ represents $C_1$–$C_5$ alkyl, benzyl or —$CH_2COOH$, and Z represents halogen, $SO_3OCH_3$, $\frac{1}{2}$ $SO_4$, $CH_3SO_3$, or $CH_3COO$.

Monomers of formula (III) include the following:

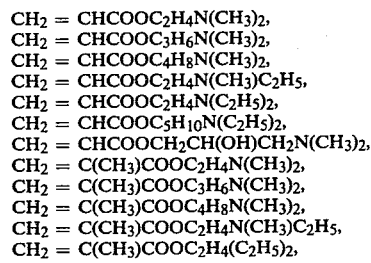

-continued
CH$_2$ = C(CH$_3$)COOC$_5$H$_{10}$N(C$_2$H$_5$)$_2$,
CH$_2$ = C(CH$_3$)COOCH$_2$CH(OH)CH$_2$N(CH$_3$)$_2$,
CH$_2$ = CHCOOC$_2$H$_4$N$^\oplus$(CH$_3$)$_3$Cl$^\ominus$,
CH$_2$ = CHCOOC$_3$H$_6$N$^\oplus$(CH$_3$)$_3$Cl$^\ominus$,

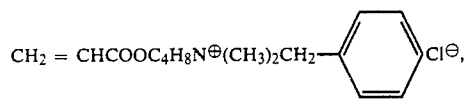

CH$_2$ = CHCOOC$_2$H$_4$N$^\oplus$(C$_2$H$_5$)$_2$CH$_2$COOHCl$^\ominus$,
CH$_2$ = CHCOOCH$_2$CH(OH)CH$_2$N$^\oplus$(CH$_3$)$_3$Cl$^\ominus$,
CH$_2$ = C(CH$_3$)COOC$_2$H$_4$N$^\oplus$(CH$_3$)$_3$Cl$^\ominus$,
CH$_2$ = C(CH$_3$)COOC$_3$H$_6$N$^\oplus$(CH$_3$)$_3$Cl$^\ominus$,
CH$_2$ = C(CH$_3$)COOCH$_2$CH(OH)CH$_2$N$^\oplus$(CH$_3$)$_3$Cl$^\ominus$,
CH$_2$ = CHCOOC$_2$H$_4$N$^\oplus$(CH$_3$)$_3$SO$_3$CH$_3$$^\ominus$,
CH$_2$ = CHCOOC$_2$H$_4$N$^\oplus$(CH$_3$)$_3$½SO$_4$$^\ominus$,
CH$_2$ = C(CH$_3$)COOC$_2$H$_4$N$^\oplus$(CH$_3$)$_3$SO$_4$CH$_3$$^\ominus$,
CH$_2$ = C(CH$_3$)COOC$_2$H$_4$N$^\oplus$(CH$_3$)$_3$CH$_3$COO$^\ominus$,
CH$_2$ = C(CH$_3$)COOCH$_2$CH(OH)CH$_2$N$^\oplus$(CH$_3$)$_3$Cl$^\ominus$, Other ethylenically unsaturated monomers capable of forming water-soluble polymers, such as styrenesulfonic acid, vinylpyridine and vinylpyrrolidone, which are outside the formulae (I), (II) and (III), can also be used as starting materials in the process of this invention.

The aforesaid monomers (a) can be used either singly or as a mixture of two or more.

Other monomers incapable of forming water-soluble high polymers can be used as comonomers in amounts which will lead to water-soluble polymers when used together with the monomer (a). Examples of such comonomers are acrylonitrile, maleic acid and vinyl acetate.

Water-soluble polymers prepared from the monomers (I), (II) and (III) differ from one another in properties, and are used in applications suitable for their respective properties.

The water-soluble polymer (b) used in the process of this invention is also a known polymer. Suitable water-soluble polymers are those having a molecular weight of 300 to 10,000,000 and containing in the polymer structural units at least one functional group selected from ether, hydroxyl, carboxyl, sulfone, sulfate ester, amino, imino, tertiary amino, quaternary ammonium and hydrazino groups. Of these, polymers having an ether group, a hydroxyl group or a carboxyl group are especially preferred. One, or a mixture, of these polymers can be used as the polymer (b). It is desirable that the polymer containing an ether, hydroxyl or carboxyl group be present in the mixture in an amount of, say, at least 10% by weight. The polymer (b) used should be different from the polymer formed from the monomer (a).

Examples of the polymer (b) used preferably in this invention include polymers containing an ether, hydroxyl or carboxyl group such as agar, gum arabic, dextran, starch, starch derivatives, cellulose derivatives, polyethylene glycol, polyethylene oxide, polypropylene glycol, a copolymer of ethylene glycol and propylene glycol, and polyvinyl alcohol; and polymers containing other groups such as polyvinyl pyrrolidone, polyvinylpyridine and polyethyleneimine.

Polyethylene glycol, polyethylene oxide, polyvinyl alcohol, and ethylene glycol/propylene glycol copolymer, and polypropylene glycol are most preferred.

In the process of this invention, the content of the polymer (b) in the aqueous solution of the water-soluble polymer (b), the amount of the monomer (a) to be polymerized, and the weight ratio of the monomer (a) to the polymer (b) are important. These factors are correlated to give the desired aqueous dispersion of a water-soluble polymer composition.

The concentration of the polymer (b) in the aqueous solution is at least 3 parts, preferably at least 5 parts, most preferably at least 10 parts, by weight per 100 parts by weight of water. It is up to 150 parts by weight at most, preferably up to 125 parts by weight, and more preferably up to 100 parts by weight. If the amount of the polymer (b) is less than 3 parts by weight, it is difficult to obtain an aqueous dispersion having a low viscosity and good stability. On the other hand, if the amount exceeds 150 parts by weight, it is difficult to dissolve the polymer (b) in water. Furthermore, since the polymer (b) itself has a high viscosity in water, the viscosity of the final aqueous dispersion of the polymer is excessively high, and the desired flowability and stability will not be obtained.

The amount of the monomer (a) to be polymerized is at least 10 parts by weight per 100 parts by weight of the water as a reaction medium. The upper limit is 150 parts by weight, preferably 100 parts by weight. In addition, the weight ratio of (a):(b) should be within the range of from 1:5 to 5:1, preferably from 1:2.5 to 2.5:1. If the amount of the monomer (a) is less than 10 parts by weight per 100 parts by weight of water, a high-molecular-weight polymer is difficult to form. On the other hand, if it exceeds 150 parts by weight, the viscosity of the final dispersion becomes too high, and the desired product with superior stability and flowability cannot be obtained. When the (a):(b) weight ratio is outside the specified range in the polymerization process, it is difficult to obtain the desired aqueous polymer dispersion. For example, when the amount of monomer (a) exceeds the limit specified by the aforesaid weight ratio, the final product becomes an aqueous dispersion having a major proportion of the polymer formed from the monomer (a), and the viscosity of the dispersion is dominated by the viscosity of the polymer derived from the monomer (a). On the other hand, when the amount of the polymer (b) exceeds the limit specified by the above weight ratio range, the final product becomes an aqueous dispersion containing a major proportion of the polymer (b), and the viscosity of the dispersion will be dominated by the viscosity of the polymer (b). In either case, the desired product having superior stability and flowability cannot be obtained.

The polymerization reaction proceeds by simply applying heat. Preferably, a radical initiator, ultraviolet light, or radial rays are used. In performing the process of this invention, it is especially preferred to use a water-soluble radical initiator such as hydrogen peroxide, potassium persulfate and ammonium persulfate, or a so-called redox system composed of such a water-soluble radical initiator and a reducing agent such as an amine or sodium sulfite. The amount of the initiator is usually 0.005 to 10% by weight based on the weight of the ethylenically unsaturated monomer (a). The initiator may be added all at the beginning of the polymerization, or a part of the initiator may be added at the beginning of the polymerization, and the remainder may be added as the polymerization proceeds.

The polymerization reaction temperature is generally 10° to 100° C., preferably 40° to 70° C. The reaction is performed so that the polymerization of the monomer (a) is substantially completed. Substantial completion means that the conversion becomes at least 90%. The time required for this purpose is generally about 3 to 10 hours. The polymerization can be performed batchwise or continuously.

If desired, a conventional surface-active agent may be added in performing the polymerization reaction. Nonionic, anionic and cationic surfactants well known in the art can be used in this invention. The nonionic surfactants, however, are preferred.

In preparing the aqueous polymer dispersion in accordance with this invention, inorganic salts soluble in water may be added as required. Examples are the chlorides, nitrates, sulfates and phosphates of metals and ammonia. Typical examples of these inorganic salts are sodium chloride, calcium chloride, calcium nitrate, sodium nitrate, ammonium nitrate, potassium sulfate, calcium phosphate, aluminum nitrate and ferric sulfate. These inorganic salts may be used singly or as a mixture. The upper limit to the amount of the inorganic salt should be the highest amount of the inorganic salt which dissolves uniformly in water. The inorganic salt may be added at once at the beginning of the polymerization, or intermittently at any desired time from the beginning to the end of polymerization. It may also be added after the end of the polymerization.

Addition of the inorganic salts is helpful to some extent for improving the stability and flowability of the resultant aqueous dispersion. This is presumably because the inorganic salt takes up moisture from the resulting polymer particles to compact and stabilize the individual polymer particles.

If further required, an organic solvent soluble in water but incapable of dissolving the resulting polymer may be added to the aqueous dispersion of the present invention. Examples of the organic solvents are alcohols such as methanol, ethanol, propanol, ethylene glycol and glycerol, ketones such as acetone and methyl ethyl ketone, ethers such as tetrahydrofuran and dioxane, and amides such as dimethylformamide and dimethylacetamide. These organic solvents may be used singly or as a mixture. The amount of the organic solvent may be any amount within which the organic solvent dissolves in water. Preferably, the amount of the organic solvent is 1 to 50% by weight based on the weight of water.

The presence of the organic solvent in the polymerization step is likely to induce chain transfer in the polymerization reaction and to lower the degree of polymerization of the resulting polymer. It is suitable therefore to add the organic solvent after the end of the polymerization reaction. Addition of the organic solvent contributes to some extent to the improvement of the stability and flowability of the resulting aqueous dispersion. The mechanism for this is presumably the same as in the case of adding the inorganic salts.

If required, the aqueous dispersion of this invention may further contain other additives such as coloring agents, pigments, dyes and perfumes.

The following Examples illustrate the present invention in more detail.

EXAMPLE 1

A 500 ml. flask equipped with a stirrer, reflux condenser and nitrogen introducing tube was charged with 100 g of water and 20 g of polyethylene glycol having a molecular weight of 20,000. They were mixed to form a solution and 30 g of acrylamide was added. While purging the inside of the flask with nitrogen gas, 1.2 ml of a 0.84% aqueous solution of ammonium persulfate and 3 ml of a 2% aqueous solution of triethanolamine were added as polymerization initiators. The polymerization was performed while stirring the reaction system at 45° C. With the progress of the polymerization, fine particles formed in the reaction system, and the stirring could be easily continued. In 5 hours, the polymerization was terminated, and the residual acrylamide in the resulting aqueous dispersion was quantitatively analyzed by liquid chromatography. It was found that the amount of the residual acrylamide was 0.024% of the amount charged, and therefore, the conversion was more than 99%. The viscosity of the resulting aqueous dispersion, measured by a rotary viscometer, was 820 poises at 30° C.

The resultant aqueous dispersion was stable after a lapse of one month. The dispersion was mixed with pure water to a polyacrylamide concentration of 1%, and the mixture was stirred. In one hour, it became a uniform solution having a viscosity, measured by a rotary viscometer, of 12 poises.

A 1% aqueous solution of commercially available powdery high-molecular-weight polyacrylamide (having an intrinsic viscosity, measured in a 1 N aqueous solution of sodium chloride, of 17 which corresponds to a molecular weight of about 500 million) had a viscosity, measured by a rotary viscometer, of 14 poises. It was thus found that the polyacrylamide formed in this Example had much the same high molecular weight.

In a kaolin test, which is a measure for the precipitability of a flocculating agent, the aqueous dispersion (polyacrylamide concentration 1%) obtained in this Example showed a better result than the commercially available solution (polyacrylamide concentration 1%).

The kaolin flocculating test was performed by placing an aqueous suspension containing 3% by weight of fine powder of kaolin into a 100 ml. measuring cylinder with a closure, adding a predetermined amount of the flocculating agent, tumbling the cylinder to stir the mixture, then allowing the cylinder to stand, and measuring the rate of settling of flocks. The results are shown in Table 1.

TABLE 1

|  | Amount (ppm) | Rate of settling (cm/sec.) |
|---|---|---|
| Invention | 10 | 1.6 |
| Commercial product | 10 | 1.4 |

COMPARATIVE EXAMPLE 1

Polymerization was performed under the same conditions as in Example 1 except that polyethylene glycol was not used. In 2 to 3 minutes after the addition of the polymerization initiators, the viscosity of the mixture rose, and the stirring failed.

EXAMPLE 2

Water (100 g), 20 g of polyethylene glycol having a molecular weight 20,000 and 5 g of soluble starch were mixed to form a solution, and then 8 g of acrylamide and 2 g of acrylic acid were added. To the mixture was added 1.12 g of sodium hydroxide to neutralize it. Then, the polymerization was performed under the same conditions as in Example 1. With the progress of the polymerization, the reaction mixture became turbid with a milky appearance. It could be sufficiently stirred although some rise in viscosity was noted. The resulting aqueous dispersion had a viscosity of 440 poises.

The aqueous dispersion was mixed with 10 times its volume of pure water, and stirred. In about 1 hour, a uniform aqueous solution was obtained which had a viscosity of 14 poises.

EXAMPLE 3

Water (100 g), 5 g of polyvinyl alcohol and 20 g of polyvinyl pyrrolidone were mixed to form a solution. Dimethyl acrylamide (25 g) was added, and the polymerization was performed under the same conditions as in Example 1 to afford an aqueous dispersion having a viscosity of 630 poises.

When the aqueous dispersion was mixed with 5 times its volume of water and stirred, a uniform solution having a viscosity of 12 poises was obtained in about one hour.

COMPARATIVE EXAMPLE 2

Polymerization was performed under the same conditions as in Example 1 except that the amount of the polyethylene glycol was changed to 2 g. In 2 to 3 minutes after the initiation of the polymerization, the viscosity of the reaction system rose abruptly, and in 5 minutes, the reaction mixture became jelly-like and could be no longer stirred.

EXAMPLE 4

Water (100 g), 40 g of polyethylene glycol having a molecular weight of 20,000 and 10 g of acrylamide were mixed to form a solution. To the solution was added 4 g of a nonionic surface-active agent (EMULGEN PP 150, a product of Kao Atlas Co., Ltd.), and the polymerization was performed under the same conditions as in Example 1 to afford an aqueous dispersion having a viscosity of 480 poises.

The aqueous dispersion was stable, and even after a lapse of 2 months, water did not separate as an upper layer. When this dispersion was diluted with 30 times its volume of pure water and stirred, a uniform solution having a viscosity of 16 poises was obtained in about 40 minutes.

EXAMPLE 5

Water (100 g), 15 g of polyethylene glycol having a molecular weight of 6,000, 5 g of polypropylene glycol having a molecular weight of 1,000 and 5 g of polyethyleneimine were mixed to form a solution. To the solution were added 20 g of acrylamide and 20 g of aminoethyl methacrylate, and furthermore, 3 g of a cationic surfactant (Amiet 208, a product of Kao-Atlas Co., Ltd.) was added. As polymerization initiators, 1 ml of a 0.75% aqueous solution of hydrogen peroxide and 3 ml of a 2% aqueous solution of sodium bisulfite were added. The polymerization was performed under the same conditions as in Example 1. An aqueous dispersion having a viscosity of 580 poises was obtained.

The aqueous dispersion was stable for more than 2 months. When the dispersion was diluted with 25 times its volume of pure water, a uniform solution having a viscosity of 11 poises was obtained in about 40 minutes.

EXAMPLES 6 TO 8

Water (100 g), 15 g of polyethylene glycol having a molecular weight of 20,000, and 10 g of polyvinyl pyrrolidone were mixed to form a solution. Then, 30 g of acrylamide was dissolved in the solution, and sodium chloride was further added in the amounts indicated in Table 2. The polymerization was performed under the same conditions as in Example 1. The results are shown in Table 2.

TABLE 2

| Example | 6 | 7 | 8 |
|---|---|---|---|
| Amount of sodium chloride added (g) | 0 | 5 | 10 |
| Viscosity of the aqueous dispersion (poises) | 450 | 430 | 430 |
| Viscosity of the dispersion diluted to a concentration of 1% (poises) | 16 | 17 | 17 |
| Time required for the formation of an aqueous solution by the dilution (minutes) | 60 | 30 | 10 |

EXAMPLES 9 TO 11

Water (100 g), 10 g of polyvinyl alcohol, 1 g of poly(sodium acrylate), 10 g of acrylamide and 10 g of aminoethyl methacrylate were mixed to form a solution. The polymerization was performed under the same conditions as in Example 1. Methanol was added in the amounts indicated in Table 3 to the resulting dispersion. The results are shown in Table 3.

TABLE 3

| Example | 9 | 10 | 11 |
|---|---|---|---|
| Amount of methanol added (g) | 0 | 10 | 30 |
| Viscosity of the dispersion (poises) | 470 | 250 | 100 |
| Viscosity of the aqueous solution obtained by dilution to a concentration of 1% (poises) | 12 | 13 | 12 |

EXAMPLE 12

Water (100 g), 50 g of polyethylene glycol having a molecular weight of 4,000, 50 g of polyvinyl pyrrolidone and 100 g of N-methylacrylamide were mixed to form a solution. The polymerization was performed under the same conditions as in Example 1 to afford an aqueous dispersion having a viscosity of 860 poises.

When this aqueous dispersion was diluted with 35 times its volume of pure water, a uniform solution having a viscosity of 10 poises was obtained in about 60 minutes.

EXAMPLE 13

Water (100 g), 80 g of polyethylene glycol having a molecular weight of 7,500 and 70 g of N-hydroxyethyl acrylamide were mixed to form a solution. The polymerization was performed under the same conditions as in Example 1 to afford an aqueous dispersion having a viscosity of 750 poises.

When the aqueous dispersion was diluted with 30 times its volume of pure water and stirred, a uniform solution having a viscosity of 15 poises was obtained in about 60 minutes.

EXAMPLE 14

Water (100 g) was mixed with 20 g of polyethylene glycol having a molecular weight of 20,000 to form a solution. To the solution were added 30 g of acrylic acid and 16.65 g of sodium hydroxide. Furthermore, a 10% aqueous solution of sodium hydroxide was added to adjust the pH of the solution to 12. Otherwise, the polymerization was performed under the same conditions as in Example 1. With the progress of the polymerization, the reaction mixture became a milky turbid suspension having some viscosity, but could be easily stirred until the end of the polymerization. After the polymerization, the residual acrylic acid in the aqueous dispersion was quantitatively determined by liquid chromatography. It was found that the amount of the residual acrylic acid was 0.022%, and the conversion was more than 99%. The resultant aqueous dispersion had a viscosity, measured by a rotary viscometer, of 780 poises. The aqueous dispersion was stable even after a lapse of one month.

When the aqueous dispersion was diluted with pure water to a poly(sodium acrylate) concentration of 0.5%, a uniform solution having a viscosity of 5 poises was formed in 1 hour.

A 0.5% aqueous solution of a commercially available powdery high-molecular-weight poly(sodium acrylate) had a viscosity, measured by a rotary viscosmeter, of 5.5 poises. It was seen therefore that the poly(sodium acrylate) formed in this Example had much the same high molecular weight.

COMPARATIVE EXAMPLE 3

Polymerization was performed under the same conditions as in Example 14 except that polyethylene glycol was not used. In about 2 to 3 minutes after the addition of the polymerization initiators, the viscosity of the reaction system rose, and its stirring was no longer possible.

EXAMPLE 15

Water (100 g), 20 g of polyethylene glycol having a molecular weight of 20,000 and 5 g of soluble starch were mixed to form a solution. To the solution were added 8 g of acrylic acid, 2 g of acrylamide and 4.44 g of sodium hydroxide. Furthermore, a 10% aqueous solution of sodium hydroxide was added to adjust the pH of the mixture to 12.

The polymerization was performed under the same conditions as in Example 1 to afford an aqueous dispersion having a viscosity of 450 poises.

When this aqueous dispersion was diluted with 20 times its volume of pure water and stirred, a uniform solution having a viscosity of 5 poises was obtained in about 1 hour.

EXAMPLE 16

Polymerization was performed under the same conditions as in Example 3 except that 25 g of methacrylic acid was added instead of 25 g of dimethylacrylamide, and 6.98 g of sodium hydroxide was added for neutralization. Thus, an aqueous dispersion having a viscosity of 420 poises was obtained.

This aqueous dispersion was stable even after a lapse of 1 month. Then, the aqueous dispersion was diluted with pure water to a poly(sodium methacrylate) concentration of 1%. In about 1 hour, a uniform solution having a viscosity of 6 poises was obtained.

COMPARATIVE EXAMPLE 4

Polymerization was performed under the same conditions as in Example 14 except that the amount of the polyethylene glycol was changed to 2 g. In 2 to 3 minutes after the initiation of the polymerization, the viscosity of the reaction system abruptly rose, and in 5 minutes, it became jelly-like and could no longer be stirred.

EXAMPLE 17

Polymerization was performed under the same conditions as in Example 4 except that the amount of the polyethylene glycol was changed to 30 g, and 60 g of acrylic acid was used instead of 10 g of the acrylamide. Thus, an aqueous dispersion having a viscosity of 400 poises was obtained.

The aqueous dispersion was stable, and no flocculation occurred even after a lapse of 2 months. When this dispersion was diluted with 60 times its volume of pure water and stirred, it became a uniform solution having a viscosity of 6 poises in about 45 minutes.

EXAMPLE 18

Water (100 g), 15 g of polyethylene glycol having a molecular weight of 6,000, 5 g of polypropylene glycol having a molecular weight of 1,000 and 5 g of polyethylenimine were mixed to form a solution. To the resulting solution were added 20 g of acrylic acid and 20 g of methacrylic acid. Then, sodium hydroxide was added to neutralize the solution. Two grams of a nonionic surfactant (EMULGEN PP 230, a product of Kao-Atlas Co., ltd.) and 1 g of a nonionic surfactant (EMULGEN 903, a product of Kao-Atlas Co., Ltd.) were added, and as a polymerization initiator, 3 ml of a 2% aqueous solution of sodium bisulfite was added.

The polymerization was performed under the same conditions as in Example 1 to afford an aqueous dispersion having a viscosity of 470 poises.

This aqueous dispersion was stable even after a lapse of 2 months. When this dispersion was diluted with 50 times its volume of pure water and stirred, a uniform solution having a viscosity of 5.5 poises was obtained in about 45 minutes.

EXAMPLES 19 TO 21

Water (100 g), 15 g of polyethylene glycol (molecular weight 20,000) and 10 g of polyvinyl alcohol were mixed to form a solution, and 30 g of acrylic acid was further dissolved. Sodium chloride was added in the amounts indicated in Table 4, and the polymerization was performed under the same conditions as in Example 1. The results are shown in Table 4.

TABLE 4

| Example | 19 | 20 | 21 |
|---|---|---|---|
| Amount of sodium chloride added (g) | 0 | 10 | 15 |
| Viscosity of the aqueous dispersion (poises) | 570 | 320 | 200 |
| Viscosity of the aqueous solution obtained by diluting the dispersion to 1% (poises) | 5.5 | 5.4 | 5.5 |
| Time required for the formation of the aqueous solution (minutes) | 45 | 15 | 7 |

EXAMPLES 22 TO 24

Water (100 g), 5 g of polyvinyl alcohol and 10 g of polyvinylpyrrolidone were mixed to form a solution. Then, 10 g of acrylic acid and 10 g of methacrylic acid were added, and were polymerized without neutralization. After the end of the polymerization, methanol was added in the amounts indicated in Table 5. The results are also shown in Table 5.

TABLE 5

| Example | 22 | 23 | 24 |
|---|---|---|---|
| Amount of methanol (g) | 0 | 10 | 30 |
| Viscosity of the dispersion (poises) | 550 | 220 | 70 |
| Viscosity of the solution obtained by dilution to 1% | 5.5 | 5.6 | 5.6 |

EXAMPLE 25

Water (100 g), 50 g of polyethylene glycol having a molecular weight of 6,000 and 50 g of polyvinylpyrrolidone were mixed to form a solution. Then, 100 g of alpha-chloroacrylic acid was added. To the solution was added 6 ml of a 2% aqueous solution of potassium hydroxide.

The polymerization was performed under the same conditions as in Example 1 to afford an aqueous dispersion having a viscosity of 890 poises.

The dispersion was diluted with pure water to a poly(potassium alpha-chloroacrylate) concentration of 0.5%. The diluted dispersion was stirred, and in about 60 minutes, a uniform solution having a viscosity of 7 poises was obtained.

EXAMPLE 26

In a 300 ml flask equipped with a stirrer, a reflux condenser and a nitrogen introducing tube, 100 g of water, and 20 g of polyethylene glycol having a molecular weight of 20,000 were mixed to form a solution. Then, 36 g of dimethylaminoethyl methacrylate was added. While purging the inside of the flask with nitrogen gas, 5 ml of a 1% aqueous solution of ammonium persulfate and 5 ml of a 6% aqueous solution of triethanolamine were added. The polymerization was performed at 60° C. with stirring in an atmosphere of nitrogen gas. With the progress of the polymerization, the reaction system became turbid with a milky apearance and its viscosity increased gradually. However, it could sufficiently be stirred. In 3 hours, the polymerization was terminated. The residual monomer in the aqueous dispersion was quantitatively determined by liquid chromatography. It was found that the amount of the residual monomer was 0.015%, and the conversion was more than 99%. The viscosity of the resulting aqueous dispersion, measured by a rotary viscometer at 30° C., was 250 poises.

When this aqueous dispersion was diluted to 30 times its volume with water to a poly(dimethylaminoethyl methacrylate) concentration of 1%, a uniform aqueous solution formed rapidly. The aqueous solution had a viscosity of 4.5 poises at 30° C. on a rotary viscometer. The aqueous dispersion was stable even after a lapse of 1 month.

COMPARATIVE EXAMPLE 5

Polymerization was performed under the same conditions as in Example 26 except that the polyethylene glycol was not used. In 3 to 5 minutes after the addition of the polymerization initiators, the viscosity of the reaction system abruptly increased to produce the Weissenberg effect. Thus, the reaction system could no longer be stirred.

EXAMPLE 27

Water (100 g), 20 g of polyethylene glycol having a molecular weight of 20,000 and 5 g of soluble starch were mixed to form a solution. Then, 6 g of dimethylaminoethyl methacrylate and 4 g of acrylamide were added. The polymerization was performed under the same conditions as in Example 26. The reaction mixture became turbid with a milky appearance with the progress of the polymerization. Although some increase in viscosity was noted, it could be fully stirred. The resulting aqueous dispersion had a viscosity of 300 poises.

When this aqueous dispersion was diluted to 8 times its volume with water, a uniform aqueous solution having a viscosity of 7.5 poises was obtained.

COMPARATIVE EXAMPLE 6

Polymerization was performed under the same conditions as in Example 26 except that the amount of the polyethylene glycol was changed to 2 g. In 3 to 5 minutes after the addition of the polymerization initiator, the viscosity of the reaction mixture rose abruptly. In 10 minutes, it became jelly-like, and could no longer be stirred.

EXAMPLE 28

Water (100 g), 5 g of polyvinyl alcohol and 20 g of polyvinylpyrrolidone were mixed to form a solution. Then, 18.8 g of diethylaminoethyl acrylate was added and polymerized under the same conditions as in Example 26 to afford an aqueous dispersion having a viscosity of 340 poises.

When the aqueous dispersion was diluted with water to 15 times its volume, the resulting aqueous solution had a viscosity of 3.0 poises.

EXAMPLE 29

Water (100 g), 16 g of polyethylene glycol having a molecular weight of 11,000 and 1 g of polyethylene oxide having a molecular weight of 100,000 were mixed. Then, 33 g of beta-methacroyloxyethyl trimethyl ammonium chloride was added. The polymerization was performed under the same conditions as in Example 26 to afford an aqueous dispersion having a viscosity of 450 poises.

When this aqueous dispersion was diluted to 22 times its volume with water, the resulting aqueous solution had a viscosity of 2.7 poises.

EXAMPLE 30

Water (100 g), 12.5 g of polyethylene glycol having a molecular weight of 20,000 and 1 g of polyethylene oxide having a molecular weight of 1,000,000 to 1,700,000 were mixed to form a solution. Then, 20 g of beta-methacroyloxyethyl trimethyl ammonium chloride and 17.5 g of acrylamide were added. While purging the inside of the flask with nitrogen gas, 1 ml of a 0.75% aqueous solution of hydrogen peroxide and 3 ml of a 2% aqueous solution of sodium bisulfite were added. The polymerization was performed for 4 hours at 45° C. with stirring. After the initiation of the polymerization, the reaction system immediately became turbid with a milky appearance, and the viscosity of the system gradually increased. It could however be stirred fully. The resulting aqueous dispersion had a viscosity of 530 poises.

When this aqueous dispersion was diluted with water to 25 times its volume, the resulting aqueous solution had a viscosity of 8 poises.

EXAMPLE 31

Water (100 g), 15 g of polyethylene glycol having a molecular weight of 6,000 and 2 g of polyethylene oxide having a molecular weight of 500,000 were mixed to form a solution. Then, 3 g of a surface active agent (EMULGEN PP 290) was added. Then, 20 g of dimethylaminoethyl methacrylate and 10 g of methacrylamide were added. The polymerization was performed under the same conditions as in Example 26 to afford an aqueous dispersion having a viscosity of 450 poises.

When this aqueous dispersion was diluted with water to 22 times its volume, the resulting aqueous solution had a viscosity of 8.5 poises.

EXAMPLE 32

Water (100 g) and 20 g of polyvinyl alcohol were mixed to form a solution, and then 30 g of acrylamide and 5 g of acrylonitrile were added. Otherwise, the polymerization was performed under the same conditions as in Example 1 to form an aqueous dispersion having a viscosity of 550 poises.

When this aqueous dispersion was diluted to a polymer concentration of 1%, the resulting aqueous solution had a viscosity of 17 poises.

EXAMPLE 33

Polymerization was performed under the same conditions as in Example 32 except that 2 g of vinyl acetate was used instead of 5 g of acrylonitrile. An aqueous dispersion having a viscosity of 500 poises was obtained. When this dispersion was diluted to a polymer concentration of 1%, the resulting solution had a viscosity of 16 poises.

EXAMPLE 34

Polymerization was performed under the same conditions as in Example 1 except that 100 g of water was mixed with 20 g of polyethylene glycol having a molecular weight of 20,000 to form a solution, and then, 25 g of acrylamide and 5 g of N-vinylpyrrolidone were added. An aqueous dispersion having a viscosity of 600 poises was prepared.

When this aqueous dispersion was diluted to a polymer concentration of 1%, the resulting aqueous solution had a viscosity of 18 poises.

EXAMPLE 35

Polymerization was performed under the same conditions as in Example 34 except that 5 g of N-vinylpyridine was used instead of 5 g of N-vinylpyrrolidone. An aqueous dispersion having a viscosity of 500 poises was obtained.

When this dispersion was diluted to a polymer concentration of 1%, the resulting aqueous solution had a viscosity of 15.5 poises.

EXAMPLE 36

Polymerization was performed under the same conditions as in Example 1 except that 100 g of water, 15 g of polyethylene glycol having a molecular weight of 20,000, 1 g of polyethylene oxide having a molecular weight of 100,000 to 150,000 and 30 g of acrylamide were used. An aqueous dispersion having a viscosity of 450 poises was obtained.

When this dispersion was diluted to a polymer concentration of 1%, the resulting aqueous solution had a viscosity of 18 poises.

EXAMPLE 37

Polymerization was performed under the same conditions as in Example 1 except that 100 g of water, 15 g of polyethylene glycol having a molecular weight of 10,000, 1 g of polyethylene oxide having a molecular weight of 1,000,000 to 1,700,000, and 30 g of acrylamide were used. An aqueous dispersion having a viscosity of 500 poises was obtained.

When this dispersion was diluted to a polymer concentration of 1%, the resulting aqueous solution had a viscosity of 17.5 poises.

EXAMPLE 38

Polymerization was performed under the same conditions as in Example 14 except that 100 g of water, 20 g of polyvinyl alcohol, 30 g of acrylic acid, 16.2 g of sodium hydroxide, and 5 g of acrylonitrile were used. An aqueous dispersion having a viscosity of 450 poises was obtained.

When this dispersion was diluted to a polymer concentration of 0.5%, the resulting aqueous solution had a viscosity of 7 poises.

EXAMPLE 39

Polymerization was performed under the same conditions as in Example 38 except that 2 g of vinyl acetate was used instead of 5 g of acrylonitrile. An aqueous dispersion having a viscosity of 400 poises was obtained.

When this dispersion was diluted to a polymer concentration of 0.5%, the resulting aqueous solution had a viscosity of 6.8 poises.

EXAMPLE 40

Polymerization was performed under the same conditions as in Example 26 except that 30 g of dimethylamino-2-hydroxypropyl methacrylate was used instead of 36 g of dimethylaminoethyl methacrylate. An aqueous dispersion having a viscosity of 270 poises was obtained.

When this dispersion was diluted to a polymer concentration of 1%, the resulting aqueous solution had a viscosity of 5.5 poises.

EXAMPLE 41

Polymerization was performed under the same conditions as in Example 26 except that 30 g of dimethylaminoethyl acrylate was used instead of 36 g of dimethylaminoethyl methacrylate. An aqueous dispersion having a viscosity of 290 poises was obtained.

When this dispersion was diluted to a polymer concentration of 1%, the resulting aqueous solution had a viscosity of 5 poises.

EXAMPLE 42

Polymerization was performed under the same conditions as in Example 26 except that 30 g of beta-methacroyloxyethyltrimethyl ammonium sulfate was used instead of 36 g of dimethylaminoethyl methacrylate. An aqueous dispersion having a viscosity of 260 poises was obtained.

When this dispersion was diluted to a polymer concentration of 1%, the resulting aqueous solution had a viscosity of 4.7 poises.

EXAMPLE 43

Polymerization was performed under the same conditions as in Example 26 except that 30 g of dimethylaminoethyl methacrylate and 5 g of acrylonitrile were used instead of 36 g of dimethylaminoethyl methacrylate. An aqueous dispersion having a viscosity of 180 poises was obtained.

When this dispersion was diluted to a polymer concentration of 1%, the resulting aqueous solution had a viscosity of 4 poises.

EXAMPLE 44

Polymerization was performed under the same conditions as in Example 43 except that 2 g of vinyl acetate was used instead of 5 g of acrylonitrile. An aqueous dispersion having a viscosity of 220 poises was obtained.

When this dispersion was diluted to a polymer concentration of 1%, the resulting aqueous solution had a viscosity of 4.5 poises.

EXAMPLE 45

Polymerization was performed under the same conditions as in Example 26 except that 30 g of beta-methacroyloxytrimethyl ammonium chloride and 5 g of N-vinylpyrrolidone were used instead of 36 g of dimethylaminoethyl methacrylate. An aqueous dispersion having a viscosity of 230 poises was obtained.

When this dispersion was diluted to a polymer concentration of 1%, the resulting aqueous solution had a viscosity of 3.8 poises.

EXAMPLE 46

Polymerization was performed under the same conditions as in Example 45 except that 5 g of N-vinylpyridine was used instead of 5 g of N-vinylpyrrolidone. An aqueous dispersion having a viscosity of 210 poises was obtained.

When this dispersion was diluted to a polymer concentration of 1%, the resulting aqueous solution had a viscosity of 4 poises.

What we claim is:

1. A process for producing an aqueous dispersion, having good stability and fluidity, of water-soluble polymers, which comprises polymerizing or copolymerizing (a) the monomer components of a composition containing at least one water-soluble ethylenically unsaturated monomer, all of said monomer components in said composition being capable of being polymerized or copolymerized with each other to form only a water-soluble polymer or copolymer, said polymerization being carried out in an aqueous solution of (b) at least one water-soluble polymer which is different from the polymer derived from said monomer components (a), said aqueous solution containing 3 to 150 parts by weight of said water-soluble polymer (b) per 100 parts by weight of water, the amount of said monomer components (a) being 10 to 150 parts by weight per 100 parts by weight of said water, the weight ratio of (a):(b) being within the range of from 1:5 to 5:1, said aqueous dispersion of water-soluble polymers being (i) a dispersion in water of a loose water-containing complex composed of said polymer or copolymer derived from said monomer components (a) and said water-soluble polymer (b), or (ii) a dispersion of said polymer or copolymer derived from said monomer components (a) in said aqueous solution of said water-soluble polymer (b).

2. The process of claim 1 wherein the monomer components (a) consists of at least one water-soluble ethylenically unsaturated monomer capable of forming a water-soluble polymer.

3. The process of claim 1 wherein said monomer components (a) is a mixture of at least one water-soluble ethylenically unsaturated monomer capable of forming a water-soluble polymer, and a comonomer which by itself is incapable of forming a water-soluble polymer but which can be copolymerized with said water-soluble ethylenically unsaturated monomer in an amount which is capable of forming a water-soluble polymer.

4. The process of claim 1 wherein a water-soluble inorganic salt is present during the polymerization or copolymerization in an amount in which it is soluble in the water, or is added in said amount to the dispersion obtained by the polymerization or copolymerization.

5. The process of claim 1 wherein said aqueous solution contains 5 to 125 parts by weight of the water-soluble polymer (b) per 100 parts by weight of water.

6. The process of claim 5 wherein said aqueous solution contains 10 to 100 parts by weight of the water-soluble polymer (b) per 100 parts by weight of water.

7. The process of claim 1 wherein the amount of said monomer components (a) is 10 to 100 parts by weight per 100 parts by weight of water.

8. The process of claim 1 wherein the weight ratio of said monomer components (a) to said water-soluble polymer (b) is within the range of from 1:2.5 to 2.5:1.

9. The process of claim 1 wherein said ethylenically unsaturated monomer is a compound containing an acroyl group.

10. The process of claim 1 wherein said ethylenically unsaturated monomer is selected from compounds of the following formulae:

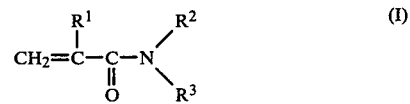

wherein $R^1$ represents hydrogen or methyl, and $R^2$ and $R^3$, independently from each other, represent hydrogen, alkyl containing 1 to 5 carbon atoms, or hydroxyalkyl containing 1 to 5 carbon atoms;

wherein R represents hydrogen, methyl or halogen, and X represents hydrogen, an alkali metal or the group —NH$_4$, and;

wherein $R^1$ represents hydrogen or methyl, and Y represents a group of the formula

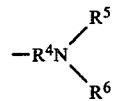

or a group of the formula

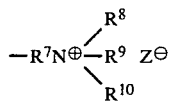

in which $R^4$ and $R^7$ represent alkylene containing 2 to 5 carbon atoms or hydroxyalkylene containing 2 to 5 carbon atoms, $R^5$, $R^6$, $R^8$ and $R^9$ represent alkyl containing 1 to 5 carbon atoms, $R^{10}$ represents alkyl containing 1 to 5 carbon atoms, benzyl or the group —$CH_2COOH$, and Z represents halogen, $SO_3OCH_3$, ½ $SO_4$, $CH_3SO_3$ or $CH_3COO$.

11. The process of claim 1 wherein said ethylenically unsaturated monomer is selected from the group consisting of acrylamide, N-methylacrylamide N,N-dimethylacrylamide, N-hydroxyethyl acrylamide, acrylic acid, alkali metal acrylates, methacrylic acid, alkali metal methacrylates, alpha-chloroacrylic acid, dimethylaminoethyl methacrylate, diethylaminoethyl acrylate, beta-methacroyloxyethyl trimethyl ammonium chloride, and beta-methacroyloxyethyl trimethyl ammonium sulfate.

12. The process of claim 1 wherein said water-soluble polymer (b) is selected from water-soluble polymers having a molecular weight of 300 to 10,000,000 and containing in the structural units of the polymer at least one functional group selected from the group consisting of ether, hydroxyl, carboxyl, sulfone, sulfate ester, amino, imino, tertiary amino, quaternary ammonium and hydrazino groups.

13. The process of claim 1 wherein the component used as the water-soluble polymer (b) contains a water-soluble polymer having in its structural units at least one functional group selected from the group consisting of ether, hydroxyl and carboxyl groups.

14. The process of claim 13 wherein the component used as the water-soluble polymer (b) contains at least 10% by weight of a water-soluble polymer containing in its structural units at least one functional group selected from the group consisting of ether, hydroxyl and carboxyl groups.

15. The process of claim 1 wherein said water-soluble polymer (b) is selected from the group consisting of polyethylene glycol, polyethylene oxide, polyvinyl alcohol, a copolymer of ethylene glycol and propylene glycol, polypropylene glycol, polyethyleneimine, polyvinyl pyrrolidone, polyvinyl pyridine, and soluble starch.

16. The process of claim 1 wherein the polymerization or copolymerization is carried out in the presence of a radical initiator at a temperature of 10° to 100° C. until the conversion of the monomer components reaches at least 90%.

17. The process of claim 1 wherein, an organic solvent soluble in water but incapable of dissolving the resulting polymer composition is added to the dispersion after the polymerization or compolymerization in an amount in which it is soluble in the water.

* * * * *